United States Patent [19]

Berger et al.

[11] 4,374,237

[45] Feb. 15, 1983

[54] SILANE-CONTAINING ISOCYANATE-TERMINATED POLYURETHANE POLYMERS

[75] Inventors: Mitchell H. Berger, Somerville; Walter P. Mayer, Lebanon; Robert J. Ward, Bridgewater, all of N.J.

[73] Assignee: Union Carbide Corporation, Danbury, Conn.

[21] Appl. No.: 333,103

[22] Filed: Dec. 21, 1981

[51] Int. Cl.$^3$ .................... C08G 18/38; C08G 77/04; C08G 77/26

[52] U.S. Cl. .................................. 528/28; 528/38; 528/59; 556/413; 556/415; 556/417; 556/419

[58] Field of Search ........................... 528/28, 38, 59

[56] References Cited

U.S. PATENT DOCUMENTS

| | | | |
|---|---|---|---|
| 2,943,103 | 6/1960 | Jex et al. | 528/38 |
| 3,042,657 | 7/1962 | Dodgson | 528/59 |
| 3,372,083 | 3/1968 | Evans et al. | 161/190 |
| 3,627,722 | 12/1971 | Selter et al. | 260/37 N |
| 3,632,557 | 1/1972 | Brode et al. | 260/77.5 TB |
| 3,711,445 | 1/1973 | Chu et al. | 260/77.5 M |
| 3,903,052 | 9/1975 | Wagner et al. | 528/59 |
| 3,979,344 | 9/1976 | Bryant et al. | 260/18 TN |
| 4,067,844 | 1/1978 | Barron et al. | 260/37 N |
| 4,222,925 | 9/1980 | Bryant et al. | 260/37 N |

FOREIGN PATENT DOCUMENTS

| | | | |
|---|---|---|---|
| 2829669 | 1/1980 | Fed. Rep. of Germany . | |
| 795894 | 6/1958 | United Kingdom | 528/38 |
| 1020052 | 2/1966 | United Kingdom | 528/38 |

*Primary Examiner*—H. S. Cockeram
*Attorney, Agent, or Firm*—Paul W. Leuzzi, II

[57] ABSTRACT

Curable isocyanate prepolymers have been made in which all or a portion of the available isocyanate terminal groups have been reacted with a secondary amine-containing silane monomer having two trialkoxy silane groups.

23 Claims, No Drawings

SILANE-CONTAINING ISOCYANATE-TERMINATED POLYURETHANE POLYMERS

DESCRIPTION

BACKGROUND OF THE INVENTION

This invention pertains to curable isocyanate terminated polyurethane prepolymers at least part of whose terminal isocyanate groups have been reacted with a secondary amine-containing silane monomer having two trialkoxy silane groups. More particularly it pertains to curable sealant compositions having enhanced wet adhesion combined with the desirable properties of polyurethanes.

BACKGROUND ART

Polyurethane polymers have been modified in the past to improve or add to their basic properties by end-capping some or all of the isocyanate groups of the polyurethane polyisocyanate prepolymer. Among the end-capping materials used are the primary and secondary aliphatic aminosilanes. Despite these earlier efforts a number of unsolved problems still exist. Firstly it was observed by practioners of this art that primary amines are too reactive leading to biuret side reactions. This is unsatisfactory since it causes product reproducibility problems or premature gelation. In order to partially overcome this difficulty, U.S. Pat. No. 3,627,722 teaches adding the aminosilane as the last ingredient of a sealant composition shortly before application to a substrate to allow limited useful working time.

U.S. Pat. No. 4,067,844 teaches the preparation of curable polyurethane prepolymers having a portion of the NCO groups reacted with reaction products of aminoalkylalkoxysilanes and various acrylates having one silyl group.

U.S. Pat. No. 3,632,557 teaches the complete end-capping of polyurethane prepolymers with primary and secondary aliphatic aminosilanes.

U.S. Pat. No. 3,372,083 utilizes a mixture of isocyanate terminated prepolymer and an isocyanate adduct of an unmodified tar to prepare a one-package caulking composition.

U.S. Pat. No. 3,711,445 discloses a polyurethane polymer containing 0.1 to 0.6% by weight of amine alkoxysilane units containing an unhindered secondary amine capable of further reaction through labile hydrogen atom.

U.S. Pat. No. 3,979,344 describes a room temperature curable silicon-terminated organic sealant composition comprising a small amount of N-beta-aminoethyl-gammaaminopropyl trimethoxy silane with an organosiliconcapped, isocyanate-terminated polyurethane polymer. These are totally end capped compositions, i.e., they contain no free —NCO groups.

U.S. Pat. No. 4,222,925 describes the same composition as U.S. Pat. No. 3,979,344 plus a high strength reinforcing carbon black filler.

Much of the prior art teachings does not provide a polyurethane prepolymer having the basic mechanical properties of conventional polyurethane polymers plus high wet adhesion. Others are deficient in shelf life.

It is an object of this invention to provide a modified polyurethane prepolymer which provides controllable end-capping of the base polyurethane prepolymer.

It is a further object of this invention to provide high bonding/cross-linking efficiency through silane end-caps.

It is still another object of this invention to provide curable polyurethane prepolymers having formulating versatility as regards one-package systems and long shelf-life.

DISCLOSURE OF INVENTION

The above-stated objects are satisfied by a curable composition comprising the reaction product of an isocyanate terminated polyurethane prepolymer having at least two urethane linkages per polymer molecule and a bis silane, said reaction product having a number average molecular weight of about 750 to about 20,000 and having 2 to about 9 functional groups per average molecular weight selected from the group consisting of:

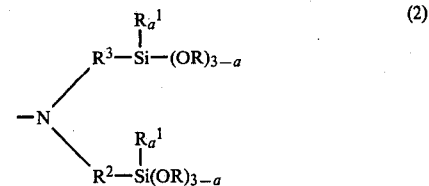

wherein R is a lower alkyl having 1 to about 6 carbons,
$R^1$ is a lower alkyl having 1 to about 4 carbons,
$R^2$ and $R^3$ are each alkylene radicals having 2–18 carbons or arylene radicals having 6–18 carbons, and
a is an integer having values of 0 to 2

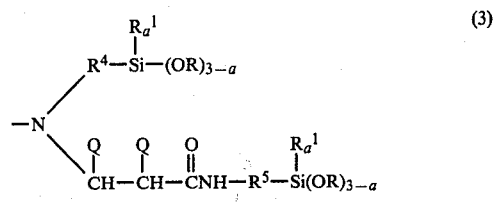

wherein
R, $R^1$ and a are as above
each of $R^4$ and $R^5$ is an alkylene radical having 1 to 4 carbons and
Q is a monovalent radical selected from the group consisting of hydrogen, alkyl having 1–4 carbons, phenyl, —COOR$^1$ or —CN, and

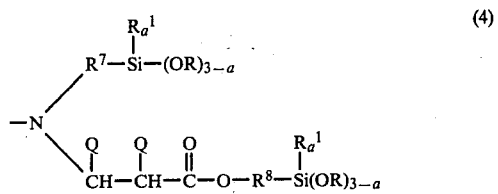

wherein
R, $R^1$ and a are as above,
each of $R^7$ and $R^8$ is an alkylene radical having 1 to 4 carbons, and
Q is a monovalent radical selected from the group consisting of hydrogen, alkyl having 1 to 4 carbons, phenyl, COOR$^1$ or —CN, with the proviso that at least 0.1 percent of the total of said functional groups (1), (2), (3) and (4) is either (2), (3), or (4).

DESCRIPTION OF THE INVENTION

Although the number average molecular weight of the bis silane-isocyanate terminated polyurethane prepolymers reaction products of this invention can have a value in the range of about 750 to about 20,000, it is preferred to have a value of about 4000 to about 14,000.

Although the number of functional groups can range from 2 to about 9, it is preferred to have 2 to about 7 functional groups.

DESCRIPTION OF THE PREFERRED EMBODIMENTS

The isocyanate terminated polyurethane prepolymers useful in the present invention are prepared by reacting a molar excess of organic polyisocyanate with one or more polyols as is well known in the art. A summary of urethane polymer chemistry and technology can be found in Polyurethanes: Chemistry and Technology, Saunders and Frisch, Interscience Publishers (New York, 1963 (Part I) and 1964 (Part II).

Any suitable organic polyisocyanate, either aliphatic, cycloaliphatic, araliphatic or aromatic, may be used. Suitable organic polyisocyanates include meta-phenylene diisocyanate, paraphenylene diisocyanate, 2,4'-diphenylmethane diisocyanate, benzidine diisocyanate, naphthalene-1,5-diisocyanate, hexamethylene diisocyanate, 4,4'4''-triphenylmethane triisocyanate, decamethylene diisocyanate, poly phenylmethylene polyisocyanates that are produced by phosgenation of aniline/formaldehyde condensation products, dianisidine diisocyanate, xylylene diisocyanate, bis(2-isocyanatoethyl)-fumarate, bis(2-isocyanatoethyl)cyclohex-4-ene-1,2-dicarboxylate, bis(2-isocyanatoethyl)carbonate, and many other organic polyisocyanates known in the art, which as those disclosed by Siefken, Annalen, 565, 122–135 (1949).

In producing the isocyanate terminated polyurethane prepolymers of the present invention, one or more polyhydroxy compounds or polyols can be employed in the reaction with the organic polyisocyanate.

Illustrative polyhydroxy compounds include the following classes of compounds:

(a) lactone polyols and the alkylene oxide adducts thereof;

(b) the polyester polyols, and the alkylene oxide adducts thereof;

(c) the polyoxyalkylene polyols and polyoxycycloalkylene polyols, and the alkylene oxide adducts thereof;

(d) the non-reducing sugars and sugar derivatives and the alkylene oxide adducts thereof;

(e) the alkylene oxide adducts of polyphenols;

(f) the polytetramethylene glycols;

(g) the functional glycerides, such as castor oil;

(h) polyhydroxy polysulfide polymers;

(i) hydroxyl terminated extended lactone polyesters prepared by phosgenating a lactone polyester with a polyol such as bisphenol A, and the like.

The term "alkylene oxide" includes, for example, ethylene oxide, 1,2-epoxypropane, 1,2-epoxybutane, 2,3-epoxybutane, isobutylene oxide oxide, epichlorohydrin, and the like and mixtures thereof.

Lactone polyols are prepared by reacting a lactone such as epsilon-caprolactone or a mixture of epsilon-caprolactone and an alkylene oxide with a polyfunctional initiator such as polyhydric alcohol. The term "lactone polyols" also includes the various "copolymers" such as lactone copolyesters, lactone polyester/polycarbonates, lactone polyester/polyethers, lactone polyester/polyether/polycarbonates, and the like. Useful lactone polyols, their preparation and properties are more fully described in U.S. Pat. Nos. 2,878,236, 2,890,208, 2,933,477, 2,933,478 and 3,169,945.

Polyester polyols are esterification products which range from liquids to non-crosslinked solids, i.e., solids which are insoluble in many of the more common inert normally liquid organic media, and which are prepared by the reaction of monocarboxylic acids and/or polycarboxylic acids, their anhydrides, their esters, or their halides, with a stoichiometric excess of a polyol. Illustrative of the polycarboxylic acids which can be employed to prepare the polyester polyols preferably included dicarboxylic acids and tricarboxylic acids, such as maleic acid, succinic acid, glutaric acid, adipic acid, pimelic acid, suberic acid, azelaic acid, sebacic acid, chlorendic acid, 1,2,4-butanetricarboxylic acid, phthalic acid, and the like, while the esterification reaction is well known in the art.

Polyoxyalkyene polyols include alkylene oxide adducts of, for example, water, ethylene glycol, diethylene glycol, propylene glycol, dipropylene glycol, gycerol, 1,2,6-hexanetriol, 1,1,1-trimethylol ethane or propane pentaerythritol, sorbitol, sucrose, lactose, alpha-methylglucoside, alpha-hydroxyalkylgluocoside, and the like. The alkylene oxides employed in producing polyoxyalkylene polyols normally have from 2 to 4 carbon atoms. Ethylene oxide, propylene oxide and mixtures of propylene oxide with ethylene oxide are preferred. Such polyalkylene polyols are well known in the art.

Illustrative of the non-reducing sugars and sugar derivatives contemplated are sucrose, the alkyl glucosides such as methylglucoside, ethyl glucoside, and the like; the polyol glucosides such as ethylene glycol glucoside, propylene glycol glucoside, glycerol glucoside, 1,2,6-hexanetriol glucoside, and the like; and the alkylene oxide adducts thereof.

Alkylene oxide adducts of polyphenols include those in which the polyphenol can be bisphenol A; bisphenol F; the condensation products of phenol and formaldehyde, more particularly the novolac resins; the condensation products of various phenolic compounds and acrolein, the simplest members of this class being the 1,1,3-tris(hydrophenyl)propanes; the condensation products of various phenolic compounds and glyoxal, glutaraldehyde, and other dialdehydes, the simplest members of this class being the 1,1,2,2-tetrabis(hydroxyphenyl)ethanes, and the like.

Another useful class of polyols is the polytetramethylene glycols, which are prepared by polymerizing tetrahydrofuran in the presence of the acidic catalyst. Also, useful are castor oil and alkylene oxide adducts of castor oil.

Suitable polyhydroxy polysulfide polymers have the formula

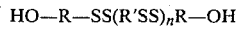

wherein R and R$^1$ are divalent aliphatic radicals wherein the carbon chain may be interrupted by oxygen atoms and n is an integer having a value of from 1 to 100, which can be prepared by reacting a dihalo-organic compound such as Cl—R'—Cl, a chlorohydrin such as Cl—R'—OH and an inorganic polysulfide.

The polyol or polyol mixture employed can have hydroxyl numbers which vary over a wide range. In general, the hydroxyl numbers of the polyols employed in the invention can range from about 20, and lower, to about 1000, and higher, preferably, from about 30 to about 800, and more preferably from about 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where
OH = hydroxy number of the polyol
f = average functionality, this is average number of hydroxyl groups per molecule of polyol
M.W. = average molecular weight of the polyol.

The most preferred polyisocyanates are alkylene diisocyanates and aromatic diisocyanates, especially tolylene diisocyanate, while the most preferred polyols are the diols of polyalkylene glycols and the diols of polycaprolactones.

As pointed out above to prepare the isocyanate terminated polyurethane prepolymers useful in this invention, at least a slight mole excess of —NCO equivalents (groups) with respect to the hydroxyl equivalents (groups) is employed to end-block the polymer chain with isocyanate groups. Of course, it should be understood that as well as employing a single type of polyisocyanate compound and a single type of polyol compound mixtures of various isocyanates as well as mixtures of various polyols may be used if desired. Furthermore, it should also be clear that the backbone of the isocyanate terminated prepolymers comprises at least one unit and more preferably repeating units of the formula

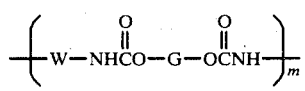

wherein G represents the residue on removal of the terminal OH groups from the hydroxy terminal polyol employed; wherein W represents a divalent hydrocarbon radical and wherein m is an integer of at least one. Thus, the backbone of said prepolymers are essentially free from other types of repeating units such as urea and the like.

For purposes of the present invention, useful isocyanate terminated polyurethanes will have a molecular weight that is governed by their intended end use. In solvent-free systems, the polymers should not be too viscous and generally have a molecular weight of from 2,000 to about 20,0000 preferably from about 4,000 to about 14,000. In solvent systems viscosity problems can be avoided and molecular weights greater than 20,000 can be used provided there is a sufficient concentration of hydrolyzable end groups to form a three-dimensional, cross-linked network upon curing. Where a solvent is employed, it should be inert with respect to the polymer and volatile under the curing conditions.

Suitable organosilicon compounds containing a reactive hydrogen atom capable of reacting with the isocyanate terminal groups of the polyurethane prepolymer are those silicon compounds of the formula:

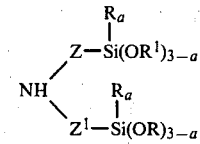

Species of suitable organosilicon compounds include:
N,N-bis[(3-trimethoxysilyl)propyl]amine;
N,N-bis[(3-triethoxysilyl)propyl]amine;
N,N-bis[(3-tripropoxysilyl)propyl]amine;
N-(3-trimethoxysilyl)propyl-3-[N-(3-trimethoxysilyl)-propylamino]propionamide;
N-(3-triethoxysilyl)propyl-3-[N-(3-triethoxysilyl)-propylamino]propionamide;
N-(3-trimethoxysilyl)propyl-3-[N-3-triethoxysilyl)-propylamino]propionamide;
3-trimethoxysilylpropyl 3-[N-(3-trimethoxysilyl)-propylamino]-2-methyl propionate;
3-triethoxysilylpropyl 3-[N-(3-triethoxysilyl)-propylamino]-2-methyl propionate;
3-trimethoxysilylpropyl 3-[N-(3-triethoxysilyl)-propylamino]-2-methyl propionate; and the like.

Background information on polyols which can be used for the polyurethane prepolymers of this invention is contained in U.S. Pat. No. 3,632,557, Column 2, line 56 to Column 4, line 19 inclusive.

Suitable isocyanates that can be used for preparing the polyurethane polymers of this invention are contained in U.S. Pat. No. 3,632,557, Column 2, lines 41 to 59; U.S. Pat. No. 3,627,722, Column 2, line 71 to Column 3, line 11 inclusive; and U.S. Pat. No. 3,711,445, Column 2, lines 3–60 inclusive.

Suitable catalysts for the preparation of the polyurethane prepolymers of this invention are presented in U.S. Pat. No. 4,067,844, Column 3, lines 25 to 36 inclusive.

The bis silanes of this invention cannot be replaced by silanes containing primary amino groups because the biuret links formed by the latter not only upsets the stoichiometry of the system but also increases the functionality leading to a variable product upon curing. Contrary to prior art teachings such as those of U.S. Pat. No. 3,627,722 and U.S. Pat. No. 4,067,844 the use of secondary amines does not eliminate branching via biuret formation, but only reduces the number of sites by half over that of primary amines.

It was therefore unexpected that the bis silanes delineated above overcome the problems of gelation and poor storage stability attributable to biuret formation because they are secondary amines.

The preparation of these bis silanes is described in U.S. Pat. No. 2,832,754, U.S. Pat. No. 2,930,809 and U.S. Pat. No. 4,209,455 which are incorporated herein by reference.

The cured compositions of this invention provide a fortuitous combination of the desirable properties of the prior art polyurethane polymers such as tear resistance, extensibility, elastic recovery, and the like, while overcoming their weak points, namely, poor wet adhesion, or poor shelf life or formulating flexibility, and the like.

The invention is further described in the Examples which follow. All parts and percentages are by weight unless otherwise specified.

EXAMPLE 1

General Procedure

An NCO terminated urethane oligomer was prepared from toluene diisocyanate (TDI), a polyoxypropylene glycol of OH Number 56 (Union Carbide NIAX Polyol PPG-2025) and a polyoxypropylene triol of OH Number 42 (Union Carbide NIAX Polyol LHT-42). The molar ratio of diol to triol was 2/1 and enough excess TDI was used to give an oligomer with 1.8 wt.% NCO. Samples of the oligomer were then end-capped with varying amounts of silanes and formulated into moisture curable sealants.

Prepolymer Synthesis Procedure

The following procedure was emphasized to prepare the prepolymer. Prior to use, the polyols were dried under vacuum for four hours at 50° C., cooled, and stored under dry nitrogen.

A five liter, three-neck, round bottom reaction flask equipped with a stirrer and heating mantle, and continuously purged with dry nitrogen, was charged with the following ingredients in the order listed:

|  | Grams |
|---|---|
| Polyoxypropylene Glycol (OH No. 56) (PPG 2025) | 2000.0 |
| 2,4-toluene Diisocyanate (TDI) | 396.8 |
| Stannous Octoate Catalyst | 0.03 |

The mixture was heated for four hours at 60° C. under continuous agitation. After the initial 4 hour reaction period, 1327 grams of LHT 240 triol and 0.03 grams of stannous octoate were added. The temperature was maintained at 60° C. until the NCO concentration was about 1.8% by weight. This typically took about 16 to 20 hours.

The isocyanate content of the polyurethane was determined by the di-n-butyl amine method using bromocresol green indicator.

The resulting isocyanate terminated prepolymer, having an NCO content of 1.78% by weight, was cooled to about 25° C. and placed in a low humidity chamber.

End-Capping the Prepolymer with Silane

N-N-bis[(3-trimethoxysilyl)propyl]amine (BTMSPA) having the structure shown in I as the principal ingredient, was stirred into the prepolymer to end-cap the NCO groups. The silane addition was performed in the glove box to exclude moisture.

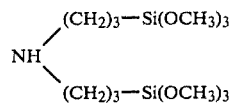

I

In this example, 0.79 grams of silane was added to 112.1 grams of prepolymer to end-cap about 5 percent of the NCO groups. Proportionately larger or smaller amounts of the BTMSPA were added to end-cap a larger or smaller percentage of the residual NCO groups covering a range of about 0.1 to 100%. Optionally, a stoichiometric excess of BTMSPA could be added.

The amine equivalent weight of the BTMSPA was 333 gms/mole N as determined by titrating with a standard solution of perchloric acid in a glacial acetic acid medium.

Formulating a Sealant from the Silylated Prepolymer

A moisture curable sealant was prepared according to the following recipe:

|  | Parts by Weight |
|---|---|
| Urethane Oligomer | 100 |
| Talc | 33.4 |
| Titanium Dioxide (TiO$_2$) | 16.6 |
| Zinc Oxide (ZnO) | 16.6 |
| Hydrogenated Castor Oil | 3.5 |

The urethane oligomer was charged to a "Hi-Vispersator" high shear mixer blanketed with dry nitrogen. The fillers, after having been over dried for 24 hours at 110° C. and cooled under dry nitrogen, were stirred into the prepolymer under high shear producing a smooth mastic. The hydrogenated castor oil thixotrope was stirred in last, and high shear mixing continued until the mass had a temperature of 83° C. Thereafter, the sealant was cooled to room temperature and stored under dry conditions.

Adhesion Behavior of Sealant

Beads of sealant having a semicircular cross-section of 3/16-inch diameter were applied on glass panels. The sealant was cured for three weeks under ambient conditions yielding a tough elastic rubber. Half of the cured specimens were immersed in water at about 25° C. for one week. The adhesion properties to glass under wet and dry aging conditions are shown in Table I. The samples were partly undercut with a razor blade and stripped in a 180° peel mode by hand.

TABLE 1

| SEALANT ADHESION TO GLASS | | | |
|---|---|---|---|
| % of NCO | Adhesion[1] | | Mode of |
| End-Capped | Dry | Wet[2] | Addition[3] |
| Sealant Prepolymer End-Capped with BTMSPA | | | |
| 0 | Poor | Poor | — |
| 2 | Good | Good | Pre |
| 5 | Exc. | Exc. | Pre |
| 10 | Exc. | Exc. | Pre |
| 10 | Exc. | Exc. | Post |
| Sealant Prepolymer End-Capped with Alkoxysilane[4] | | | |
| 5 | Good | Poor | Pre |

[1]Excellent = Cohesive Failure
Good = Mixed Cohesive/Adhesive Failure
Poor = Adhesive Failure
[2]Seven days water soak at about 20° C.
[3]Pre = Silane added to oligomer prior to compounding.
Post = Silane added to oligomer while compounding.
[4]Alkoxy Silane having structure HN—R'—Si(OCH$_3$)$_3$
                                             |
                                             R
R' = alkylene;
R = alkyl or aryl.

Interpretation of Table I

The data in Table I illustrate that the BTMSPA is much more efficient as an adhesion promoter than an amino trialkoxy silane with one trialkoxysilane group, even when compared on the basis of equal molar concentrations of Silicon in the sealant.

The data also show that the BTMSPA is effective as an adhesion promoter when added either before or after compounding the prepolymer.

EXAMPLE 2

A urethane prepolymer was prepared using the procedure described in Example 1. Two self-leveling sealants were formulated according to the following recipes. The ingredients were added in the order listed to a high shear mixer and mixed for five minutes under a dry nitrogen blanket. Five percent of the residual NCO groups were end-capped.

|  | Parts by Weight | |
| --- | --- | --- |
|  | Formulation A | Formulation B |
| Prepolymer | 100 | 100 |
| TiO$_2$[1] (Rutile) | 13.9 | 10 |
| ZnO | 13.9 | — |
| Talc[2] | 33.4 | — |
| CaCO$_3$[3] | — | 100 |
| BTMSPA | 0.67 | 0.67 |

[1]DuPont 901;
[2]Micro-Talc CD 1435;
[3]Camelwite

Test specimens were prepared, cured and aged according to Federal Specification TT-S-00230C. Both sealants retained complete cohesive and adhesive integrity on glass and concrete substrates after undergoing the rigorous Durability (Bond Cohesion) Test specified in Federal Specification TT-S-00230C for Class A, Type I sealants. Type I are self leveling sealants and Class A sealants are those which withstand a specified number of cycles of extension and compression of $+/-25\%$.

The sealants had the following tensile properties:

|  | Formulation | |
| --- | --- | --- |
|  | A | B |
| Tensile Strength, psi | 228 | 113 |
| Elongation % | 225 | 200 |

The tensile specimens were prepared by casting ¼-inch thick sheets of sealant and curing for 7 days at about 77° F./50% RH, 7 days at 100° F./75% RH, and 7 days at about 77° F./50% RH. An ASTM "C die" was used to cut "dog bone" specimens which were pulled on an Instron Tester at 0.2 inches per minute.

EXAMPLE 3

The prepolymer synthesis procedure of Example 1 was repeated except:

The diol was NIAX Polyol PPG 3025 polyoxypropylene glycol (OH No. 37).

The triol was NIAX Polyol LHT 28 polyoxypropylene triol (OH No. 28).

The residual NCO was 1.74%.

Formula weights and order of addition used in preparing prepolymer were:

|  | Grams |
| --- | --- |
| PPG 3025 | 1140 |
| TDI | 271 |
| Stannous Octoate | .03 |
| LHT 28 | 1600 |
| Stannous Octoate | 0.03 |

To each 100 parts of prepolymer, 0, 0.69, or 1.38 parts of BTMSPA were added to achieve 0, 5, or 10 percent endcapping respectively.

The resulting three oligomers were sealed in metal cans and stored in a low humidity chamber. The sealant viscosity was periodically measured with a Brookfield viscometer over a one year period. The viscosity change with time is shown in Table II. At the end of one year, all of the oligomers were fluid and could be readily formulated into a sealant.

The adhesion performance of freshly prepared vs aged oligomers was determined by casting beads of oligomer on glass, curing and hand peeling using the method described in Example 1. Wet adhesion was tested by soaking the panels in water for one week at about 20° C. The test results are shown in Table III. A non-end-capped oligomer tested as a control had poor wet or dry adhesion.

The results shown in Table III illustrate that the superior adhesion properties of the end-capped urethane oligomers were retained on aging.

TABLE II

STABILITY OF SILATED URETHANE OLIGOMERS[1]

| Silane | End-Capped | Viscosity[2] ($10^3$ cps) | | | |
| --- | --- | --- | --- | --- | --- |
|  |  | 1 day | 1 mo. | 6 mos. | 12 mos. |
| None | 0 | 8 | 15 | 25 | 29 |
| BTMSPA | 5 | 8 | 19 | 30 | 37 |
| BTMSPA | 10 | 8 | 22 | 35 | 42 |

[1]TDI/polyoxypropylene glycol, OH Number 37/polyoxpropylene triol, OH Number 28 (271/1140/1600)
[2]Brookfield viscometer.

TABLE III

EFFECT OF AGING ON ADHESION

| Age of Oligomer[1] | Wt. % NCO | Viscosity ($10^3$ cps) | Adhesion | |
| --- | --- | --- | --- | --- |
|  |  |  | Dry | Wet |
| 4 Days | 1.74 | 15 | Excellent | Excellent |
| 12 Months | 1.20 | 42 | Excellent | Excellent |

[1]Oligomer as described in Example 2. 10% available NCO end-capped with BTMSPA.

EXAMPLE 4

This example illustrates the utility of BTMSPA for the preparation of totally end-capped polyurethane prepolymers for use in a moisture-curable coating or sealant.

A ½ mole ratio of a triol and 2,4-toluene diisocyanate (TDI) were charged to a 3 liter reaction flask equipped with a stirrer thermometer, nitrogen blanket and heating mantle. The reactants were heated to 60° C. and held there until a theoretical NCO concentration was reached.

The reactor was charged with the following:

435.0 grams of TDI;

2500 grams of a triol based on a propylene oxide adduct of glycerine with a hydroxyl number of 58.

After 8 hours at 60° C., and 16 hours at room temperature, the NCO concentration of the oligomer was 3.62% by weight.

The urethane oligomer was stored in a flask under nitrogen blanket and transferred into smaller flasks as needed through a closed system, using suction to prevent exposure to atmospheric moisture.

Total End-Capping 135.8 grams of the oligomer was transferred into a dry, nitrogen purged 500 ml flask equipped with a thermometer, stirrer, nitrogen blanket, and heating mantle. The reaction mixture was raised to 60° C., and 40.0 grams of BTMSPA was added dropwise with stirring. The molar ratio of NCO/NH was 1/1. The silane addition was complete in one hour. An infra-red scan showed no free NCO groups remaining.

Determination of Cure Rate

Glass panels 3"×1½" were washed in Alconox solution (detergent) followed by water rinse and acetone rinse. The panels were weighed, coated with silane end-capped prepolymer, using a #70 wire wound rod (film thickness 5 mils) and reweighed. The coated samples were then placed in a constant temperature-humidity room at 72° F., 50% RH. At specified intervals of exposure, the samples were then placed in a Soxhlet Extractor and extracted with hot methyl ethyl ketone solvent for 1 hour. The glass panels were then dried in a 100° C. forced air oven for 15 minutes, cooled to room temperature, and weighed. The percent film retention as a function of cure time was then plotted.

Under the cure conditions described above, the totally end-capped oligomer sample attained 50% insolubility in about 24 hours.

EXAMPLE 5

The prepolymer of Example 1 was prepared. N-(3-trimethoxysilyl)propyl-3-[N-(3-trimethoxysilyl)-propylamino]propionamide, having the structure shown in IIA as the principal ingredient, was stirred into the prepolymer by the procedure described in Example 1.

$$H-N \begin{cases} (CH_2)_3-Si-(O-R)_3 \\ (CH_2)_2-\overset{O}{\underset{\|}{C}}-\overset{H}{\underset{|}{N}}-(CH_2)_3-Si-(O-R)_3 \end{cases} \quad \text{II}$$

$R = -CH_3$           IIA $R = -C_2H_5$          IIB

In this example, 0.83 grams of silane IIA was added to 100.0 grams of prepolymer having a free NCO concentration of 1.68% by weight, to end-cap about 5 percent of the NCO groups.

Proportionately larger or smaller amounts of silane (IIA) were added to end-cap larger or smaller percentages of residual NCO groups covering the 2–10 percent range described in Table IV.

The amine equivalent weight of the silane (IIA) was 417 gms/mole N as determined by titrating with a standard solution of perchloric acid in glacial acetic acid medium.

Moisture curable sealants representing varying degrees of end-capping were prepared using the urethane oligomers described above. The formulation, compounding and sample preparation procedures were the same used in Example 1. The adhesion behavior is described in Table IV. Results on comparable sealants made using silane IIB are also shown.

TABLE IV

| | SEALANT ADHESION TO GLASS | | | |
|---|---|---|---|---|
| | % of NCO | Mode of[2] | Adhesion[3] | |
| Silane[1] | End-Capped | Addition | Dry | Wet[4] |
| None | — | — | Poor | Poor |
| II A | 10 | Pre | Exc. | Exc. |
| II A | 10 | Post | Exc. | Exc. |
| II A | 5 | Pre | Exc. | Exc. |
| II A | 2 | Pre | Fair | Poor |
| II B | 10 | Pre | Good | Good |
| II B | 10 | Post | Good | Good |

[1] II A = N—(3-trimethoxysilyl)propyl-3-[N—trimethoxysilyl)propylamino] propionamide.
II B = N—(3-triethoxysilyl)propyl-3-[N—triethoxysilyl)propylamino] propionamide.
[2] Pre = Silane added to oligomer prior to compounding.
Post = Silane added to oligomer while compounding.
[3] Exc. = Cohesive failure.
Good = Mixed cohesive/adhesive failure.
Poor = Adhesive failure.
[4] Seven days water soak.

EXAMPLE 6

Silated urethane oligomers were prepared using the NCO terminated urethane oligomer of example 3 partly end-capped with silanes IIA and IIB of example 5.

The shelf life of these oligomers, stored under the same conditions described in example 3, are shown in Table V. The shelf life shown is adequate for most commercial applications.

TABLE V

| STABILITY OF SILATED URETHANE OLIGOMERS | | | | | | |
|---|---|---|---|---|---|---|
| | End- | Viscosity ($10^3$ cps)[1] | | | | |
| Silane | Capped | 1 Day | 1 Mo. | 2 Mos. | 6 Mos. | 12 Mos. |
| None | 0 | 8 | 15 | 20 | 25 | 29 |
| II A | 5 | 10 | 34 | 41 | 48 | 71 |
| II A | 10 | 22 | 43 | 53 | 62 | 80 |

[1] Measured using Brookfield Viscometer.

EXAMPLE 7

An amino functional bis-silane adduct 1,3-trimethoxysilylpropyl-3-[N-(3-trimethoxysilyl)propylamino]-2-methyl propionate was prepared by blending 86.94 grams of gamma-methacryloxypropyltrimethoxy silane with 59.77 grams of gamma-aminopropyltrimethoxy silane. This was approximately a 1.05/1.00 molar ratio. The blend was placed in a closed flask blanketed with dry nitrogen and allowed to react for 96 hours at 60° C. The reaction product was analyzed by gas chromatography and found to contain a silane having the structure III as the principal component.

$$HN \begin{cases} (CH_2)_3-Si(OCH_3)_3 \\ CH_2-\overset{CH_3}{\underset{|}{\underset{H}{C}}}-\overset{O}{\underset{\|}{C}}-O-(CH_2)_3-Si-(OCH_3)_3 \end{cases} \quad \text{III}$$

The product was stripped under full vacuum for one hour to remove traces of methanol and other low boiling impurities. The remaining sample was titrated with standard solution of perchloric acid in glacial acetic acid to determine its amine equivalent weight as 486.9.

A prepolymer prepared by the method of example 1 having 1.81 percent NCO by weight was then partially end-capped with silane III such that 5% of the NCO groups were reacted. The ratio used was 10.17 grams of silane III to 969 grams of prepolymer. The result was a moisture curable silated urethane prepolymer with excellent adhesion to inorganic substrates. The properties achieved are similar to those described for comparably end-capped urethane prepolymers described in prior examples.

The polymers of this invention can also be modified by incorporating therein any of the conventional elastomer fillers, e.g., reinforcing fillers, such as fume silicas, silica aerogels and precipitated silicas of high surface area. Nonreinforcing fillers can also be used, for example, coarse silicas, such as diatomaceous earth, crush quartz or metallic oxides, such as titania, ferric oxide, zinc oxide, talc and the like. In addition fibrous fillers such as asbestos or glass fibers or filaments may be used. In all cases, it is desirable that the filler be substantially dry before admixed with the polymers. The fillers are generally employed to upgrade physical properties and to modify the flow characteristics of the uncured polymer. The polymers of this invention may also contain modifiers such as resinous siloxane modifiers as plasticizers or to make the polymers more dough-like and less resilient, as well as additives such as pigments, UV stabilizers, oxidation inhibitors and the like or dielectric substances such as graphite and carbon black. It is immaterial whether these fillers, modifiers or additives and the like are added to the polymers of this invention during or after their preparation as described herein. However, it is most preferable that they be added under substantially anhydrous conditions.

The vulcanizable polymers of this invention are useful in coating applications and in caulking and sealing applications on buildings, airplanes, bathroom fixtures, automotive equipment and the like, and as encapsulating and potting compounds. One desirable feature is their ability to be applied to moist or wet surfaces and be cured into a cross-linked elastomer without deleterious effects, which cured product becomes tack-free within a relatively short period of time. Moreover, the cured polymers of this invention strongly adhere alone or with the aid of a primer to a wide variety of substrates such as glass, porcelain, wood, metals, polymeric materials and the like making them especially suited for any type of caulking, adhesive or laminating application.

While the invention is not limited to any theory or explanation, it is believed that the cured polymers obtained through it are superior to prior art polyurethanes by virtue of the multiplicity of hydrolyzable —Si(OR)$_3$ groups provided by the bis silane structure contained therein. This permits a larger number of sites for bonding to substrates through the hydroxyl groups and reinforced bonding by bridging of two or more —Si(OR)$_3$ groups.

Although the invention has been described in its preferred forms with a certain degree of particularity, it will be understood by those skilled in the art that the present disclosure has been made only by way of example and that numerous changes can be made without departing from the spirit and the scope of the invention.

We claim:

1. A curable composition comprising the reaction product of an isocyanate terminated polyurethane prepolymer having at least two urethane linkages per polymer molecule and a bis silane, said reaction product having a number average molecular weight of about 750 to about 20,000 and having 2 to about 9 functional groups, per average molecular weight, selected from the group consisting of:

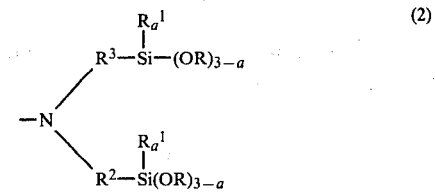

wherein
R is a lower alkyl having 1 to about 6 carbons;
R$^1$ is a lower alkyl having 1 to about 4 carbons;
each of R$^2$ and R$^3$ is an alkylene radical having 2 to 18 carbons or arylene radicals having 6 to 18 carbons, and
a is an integer having values of 0 to 2;

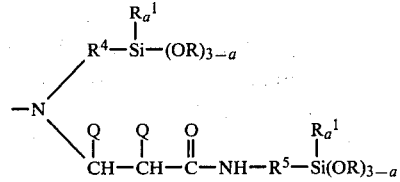

wherein
R, R$^1$ and a are as above,
each of R$^4$ and R$^5$ is an alkylene radical having 1 to 4 carbons, and
Q is a monovalent radical selected from the group consisting of hydrogen, alkyl having 1 to 4 carbons, phenyl, —COOR$^1$ or —CN; and

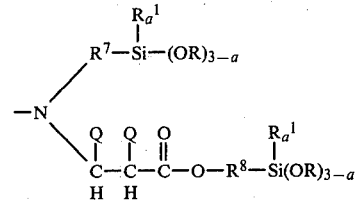

wherein
R, R$^1$ and a are as above,
each of R$^7$ and R$^8$ is an alkylene radical having 1 to 4 carbons, and
Q is a monovalent radical selected from the group consisting of hydrogen, alkyl having 1 to 4 carbons, phenyl, COOR$^1$ or —CN,
with the proviso that at least 0.1 percent of the total of said functional groups (1), (2), (3) and (4) is at least one of (2), (3), or (4).

2. Composition claimed in claim 1 containing about 0.1 to about 100 percent of functional group (2).

3. Composition claimed in claim 1 containing about 0.1 to about 100 percent of functional group (3).

4. Composition claimed in claim 1 containing about 0.1 to about 100 percent of functional group (4).

5. Composition claimed in claim 2 wherein the functional group (2) is:

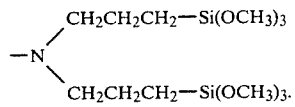

6. Composition claimed in claim 3 wherein the functional group (3) is:

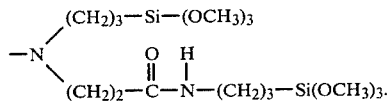

7. Composition claimed in claim 4 wherein the functional group (4) is:

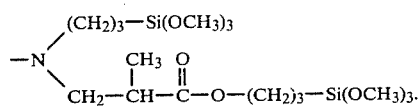

8. Composition claimed in claim 1 wherein the polyurethane is the reaction product of polyoxyalkylene polyol and an aromatic diisocyanate.

9. Composition claimed in claim 8 wherein the polyoxyalkylene polyol is a polyoxyalkylene glycol and the aromatic diisocyanate is toluene diisocyanate.

10. Composition claimed in claim 1 wherein the polyurethane is the reaction product of a polyoxyalkylene diol, a polyoxyalkylene triol and an aromatic polyisocyanate.

11. Composition claimed in claim 10 wherein the polyoxyalkylene diol is a polyoxypropylene glycol, the polyoxyalkylene triol is a polyoxypropylene triol and the aromatic polyisocyanate is toluene diisocyanate.

12. The cured polymer of claim 1.
13. The cured polymer of claim 2.
14. The cured polymer of claim 3.
15. The cured polymer of claim 4.
16. The cured polymer of claim 5.
17. The cured polymer of claim 6.
18. The cured polymer of claim 7.
19. A sealant composition comprising the curable composition claimed in claim 1.
20. A method of formulating a sealant composition having enhanced wet adhesion which comprises:
   (1) reacting a polyol with a stoichiometric excess of a polyisocyanate to provide an —NCO terminated polyurethane prepolymer; and
   (2) end-capping at least 0.1% of said —NCO terminal groups by contacting them with a bis-silane selected from the group consisting of:

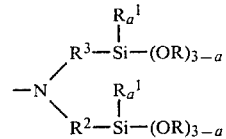

wherein
R is a lower alkyl having 1 to about 6 carbons;
$R^1$ is a lower alkyl having 1 to about 4 carbons,
each of $R^2$ and $R^3$ is an alkylene radical having 2 to 18 carbons or arylene radicals having 6 to 18 carbons, and
a is an integer having values of 0 to 2;

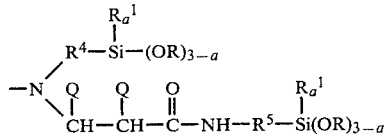

wherein
R, $R^1$ and a are as above,
each of $R^4$ and $R^5$ is an alkylene radical having 1 to 4 carbons, and
Q is a monovalent radical selected from the group consisting of hydrogen, alkyl having 1 to 4 carbons, phenyl, —$COOR^1$ or —CN; and

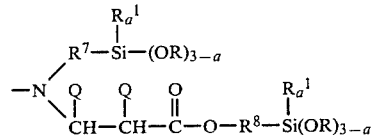

wherein
R, $R^1$ and a are as above,
each of $R^7$ and $R^8$ is an alkylene radical having 1 to 4 carbons, and
Q is a monovalent radical selected from the group consisting of hydrogen, alkyl having 1 to 4 carbons, phenyl, $COOR^1$ or —CN.

21. Method claimed in claim 20 wherein the bis-silane is (A).
22. Method claimed in claim 20 wherein the bis-silane is (B).
23. Method claimed in claim 20 wherein the bis-silane is (C).

* * * * *